United States Patent [19]

Kullendorff

[11] 4,132,343

[45] Jan. 2, 1979

[54] METHOD FOR MANUFACTURING A PIPELINE HAVING AN INTERNAL PROTECTIVE LAYER

[75] Inventor: Anders Kullendorff, Finspang, Sweden

[73] Assignee: BBC Brown, Boveri & Company Limited, Baden, Switzerland

[21] Appl. No.: 773,268

[22] Filed: Mar. 1, 1977

[30] Foreign Application Priority Data

Mar. 4, 1976 [SE] Sweden .................. 7603003

[51] Int. Cl.² .............................................. B23K 5/08
[52] U.S. Cl. .................................. 228/168; 228/172; 228/176; 228/263
[58] Field of Search ............... 228/168, 169, 172, 176, 228/226, 214, 184, 263

[56] References Cited

U.S. PATENT DOCUMENTS

| 2,412,271 | 12/1946 | Kercher | 228/176 |
| 2,943,387 | 7/1960 | Dawson | 228/226 |
| 3,135,047 | 6/1964 | Houser | 228/226 X |
| 3,289,293 | 12/1966 | Stenquist | 228/214 X |
| 3,325,191 | 6/1967 | Yates | 228/214 X |
| 3,541,670 | 11/1970 | McCrory | 228/176 |

*Primary Examiner*—Donald G. Kelly
*Attorney, Agent, or Firm*—Burns, Doane, Swecker & Mathis

[57] ABSTRACT

A pipeline consisting of lengths of steel pipe welded together in end-to-end relation is made by first weld-plating the internal surface of the end portions of each individual pipe length with a corrosion-resistant material. A protective layer is then applied to the internal surface of each pipe length between the weld-plated end portions, the latter having first been smoothed down by machining to the desired finished thickness of the protective layer. The pipe lengths are then welded together in end-to-end relation. The welding operation consists of first depositing a root bead encircling the pipe at the junction of the ends of the weld-plated material. Weld material is then deposited in and fills out the gap between bevelled edges of the pipe ends to substantially the outside diameter of the pipe.

9 Claims, 1 Drawing Figure

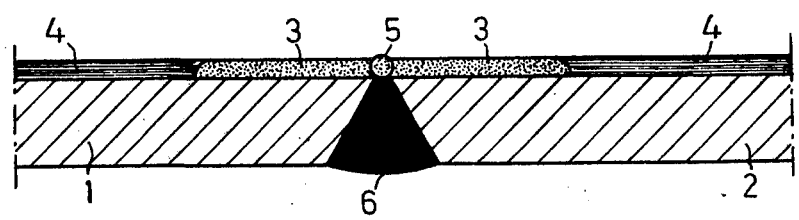

METHOD FOR MANUFACTURING A PIPELINE HAVING AN INTERNAL PROTECTIVE LAYER

BACKGROUND OF THE INVENTION

This invention relates to an improved method of manufacturing a pipeline from lengths of steel pipe welded together in end-to-end relation, particularly for use in the transmission of wet steam, and wherein the internal surface of each length of pipe is provided with a protective, corrosion-resistant layer prior to the welding operation. Pipelines of this type are primarily used in turbine plants wherein the steam is preferably not susperheated, e.g., in nuclear power plants. The invention relates also to a pipeline constructed in accordance with the improved method.

A method for protection of the internal surface of a pipeline made from steel against erosion or corrosion, or a combination of both, as may occur in pipelines that are subjected to wet, hot steam, is described in a Swedish patent application No. 75 11424-9. The method described in that application can be utilized for pipelines possessing a diameter sufficiently large to permit work to be done inside the pipeline after the pipe lengths have been welded together and installed. It is also feasible to treat the pipe lengths individually prior to welding them together, the welding joints being treated thereafter upon completion of the assembly. Pipelines made from steel and possessing smaller diameters do not permit surface treatment subsequent to completion of the welding operation.

SUMMARY OF THE INVENTION

In accordance with the present invention as more particularly set forth in the appended claims, the internal surface of the end portions of each individual pipe length is weld-plated with a corrosion-resistant material; thereafter, the protective layer is applied to the internal surface of each pipe length between the weld-plated end portions, and during the subsequent operation of welding the pipe lengths together in end-to-end relation, a root bead encircling the pipe and which consists substantially of the same material as is used for the internal weld-plating, is applied at the junction of the ends of the weld-plated material. Weld material is then deposited in the gap between bevelled edges of the pipe ends so as to fill out the gap to substantially the outside diameter of the pipe. In this manner there is obtained throughout the entire welding zone an interconnected corrosion-resistant layer. One suitable construction for the improved pipeline consists of pipe lengths made from carbon tool steel, and wherein austenitic corrosion-resistant steel is used for the internal plating at the ends of the pipe lengths as well as for the root bead of the weld joining the pipe lengths in end-to-end relation. A suitable material for the internal protective layer between the weld-plated end portions is a ceramic material applied on the surface by thermal spraying.

BRIEF DESCRIPTION OF THE DRAWING

One suitable embodiment of the invention is illustrated in the accompanying drawing, the single view of which is a fragmentary longitudinal section through the wall of the pipeline at the welded-together end portions of adjacent pipe lengths.

DETAILED DESCRIPTION OF A PREFERRED EMBODIMENT

The end portions of two pipe lengths 1, 2 of a pipeline are shown in the drawing after having been welded together in end-to-end relation. The pipe lengths are manufactured, for example, from carbon tool steel, or a similar but more ordinary steel. Prior to welding the pipe lengths together, the internal end portions of the pipe lengths are first "weld-plated" with a layer 3 of protective material such as an austenitic rust-resistant steel. The protective layer 3 is then smoothed by machining down to a thickness which will be identical to the specifically designed protective layer 4 for the internal surface of the pipe lengths between the weld-plated material 3 which is then applied in the manner as described in the above-referenced Swedish application. More particulary, The protective layer 4, for example may be a ceramic material applied by thermal spraying and with a basic substance substantially comprising one or more of the metals aluminium, zirconium, chromium, titanium, nickel or magnesium. Also the ceramic layer may be applied on a basic layer of nickel aluminide. The total thickness of the layer 4 may be about 100–150 microns for the ceramic layer and about 10–25 microns for said basic layer.

Following application of the protective layer 4, the pipe lengths 1 and 2 can then be welded together. The welding operation consists first in forming a root bead 5 around the pipe ends at the junction between the ends of the weld-plated material 3, austenitic rust-resistant steel being used as the bead material. This is then followed by filling in welding material 6 in the gap formed between bevelled edges of the pipe ends, the material 6 being metallurgically compatible, from a welding point of view, with the material from which the pipe lengths 1 and 2 are made which in the case of the illustrated embodiment is carbon tool steel.

When selecting materials for the weld-plated layer 3 the protective layer 4 and the root bead 5, it is always necessary to make certain that these materials agree with one another insofar as electrical potentials are concerned in order to avoid any corrosive effect brought about through galvanic action. It is also possible to plate the seam surfaces prior to welding-together operation in which case a suitable welding material is chosen.

The filler weld metal 6 can also be a rust-resistant steel conventionally known under the trade-name "Inconel".

I claim:

1. A method for manufacturing a pipeline from lengths of steel pipe welded together in end-to-end relation to be used, for example, for the transmission of wet steam, comprising the steps of:
   weld-plating the internal end portions of adjoining pipe lengths with a layer of corrosion-resistant material,
   applying a protective layer of a particular thickness of a material resistant to erosion and corrosion to the internal surfaces of said pipe lengths between the weld-plated layers,
   providing a ring gap at the ends of adjoining pipe lengths when the ends are arranged closely adjacent to one another,
   applying a root bead of substantially the same material as is used for the weld-plated layer around the adjoining pipe ends at the junction ends of the weld-plated layer, and filling out the ring gap formed between adjoining edges of the pipe ends with welding material.

2. The method as defined in claim 1 for manufacturing a pipeline from steel pipe lengths welded together in end-to-end relation and which includes the further step of machining down the weld-plated layer to a thickness substantially identical to the protective layer thickness.

3. The method as defined in claim 1 for manufacturing a pipeline from pipe lengths of carbon tool steel welded together in end-to-end relation and wherein austenitic corrosion-resistant steel is used for said weld-plated layers and for said root beads.

4. The method as defined in claim 1 for manufacturing a pipeline from pipe lengths welded together in end-to-end relation and which includes the further step of weld-plating the seam surfaces of the pipe ends prior to the step of welding the pipe lengths together.

5. The method as defined in claim 1 wherein said ring gap is formed by providing beveled edges for the ends of adjoining pipe lengths.

6. A method of joining together end portions of two lengths of steel pipe in an end-to-end relation for use, for example, to transmit wet steam, comprising the steps of:

weld plating an internal end portion of each of the two lengths of steel pipe adjacent to the weld-plated layer;

applying a protective layer of a particular thickness of a material resistant to erosion and corrosion to an internal surface of each of the two lengths of steel pipe adjacent to the weld-plated layer;

forming a ring gap between the end portions of the two lengths of steel pipe by arranging the end portions closely adjacent to one another;

applying a root bead of substantially the same material as is used for the weld-plated layer around the adjoining pipe ends at a junction between the weld plated layers of the closely adjacent end portions;

filling out the ring gap formed between the closely adjacent end portions with welding material.

7. The method of claim 6 wherein the weld-plated layer is machined to a thickness which is substantially identical to the protective layer thickness.

8. The method of claim 6 wherein the steel pipe is formed of carbon tool steel and wherein the root bead and the weld-plated layers are formed of austenitic corrosion-resistant steel.

9. The method of claim 6 wherein the internal end portions of the two lengths of steel pipe are weld-plated before the ring gap is filled out.

* * * * *